United States Patent [19]
Kohrn

[11] 4,416,649
[45] Nov. 22, 1983

[54] REDUCED NOISE POSITIVE DRIVE POWER TRANSMISSION SYSTEM

[75] Inventor: Robert C. Kohrn, Bethany, Conn.

[73] Assignee: Uniroyal, Inc., New York, N.Y.

[21] Appl. No.: 75,476

[22] Filed: Sep. 14, 1979

[51] Int. Cl.$^3$ ............................................. F16G 5/20
[52] U.S. Cl. ................................. 474/153; 156/138; 474/205; 474/250
[58] Field of Search ............... 474/148, 153, 205, 249, 474/250; 156/137, 138

[56] References Cited

U.S. PATENT DOCUMENTS

| | | | |
|---|---|---|---|
| 2,507,852 | 5/1950 | Case | 474/148 |
| 2,802,511 | 8/1957 | Waugh | 156/138 |
| 2,988,925 | 6/1961 | Sauer | 474/205 |
| 3,078,206 | 2/1963 | Skura | 156/196 |
| 3,756,091 | 9/1973 | Miller | 74/231 C |
| 3,924,481 | 12/1975 | Gregg | 474/153 |
| 3,968,701 | 7/1976 | Maruyama | 156/138 X |
| 3,996,812 | 12/1976 | Cappotto et al. | 74/231 C |
| 4,007,644 | 2/1977 | Weinberger | 474/153 |
| 4,037,485 | 7/1977 | Hoback | 474/148 |
| 4,066,732 | 1/1978 | Redmond | 156/140 |
| 4,108,011 | 8/1978 | Gregg et al. | 474/153 |
| 4,168,634 | 9/1979 | Griffel | 74/243 R |
| 4,264,314 | 4/1981 | Imamura | 474/250 X |

OTHER PUBLICATIONS

United Kingdom Patent Application No. 2,013,303, published 8/8/79; Inventors Lalevee et al.

Primary Examiner—Rodney H. Bonck
Attorney, Agent, or Firm—Henry Sternberg

[57] ABSTRACT

In a positive drive power transmission system composed of a toothed belt and two or more pulleys, operating noise resulting from the impact of the belt and the pulleys is dramatically reduced by having surface discontinuities on either the belt or on the pulleys on those surfaces where the belt and the pulleys engage in impact contact when in operation. The surface discontinuities may be formed by recessed or raised portions of the belt or pulleys, may be straight or curved, and may be substantially parallel to the tensile member or at an angle thereto. Several methods of manufacturing belts with such surface discontinuities are disclosed.

37 Claims, 33 Drawing Figures

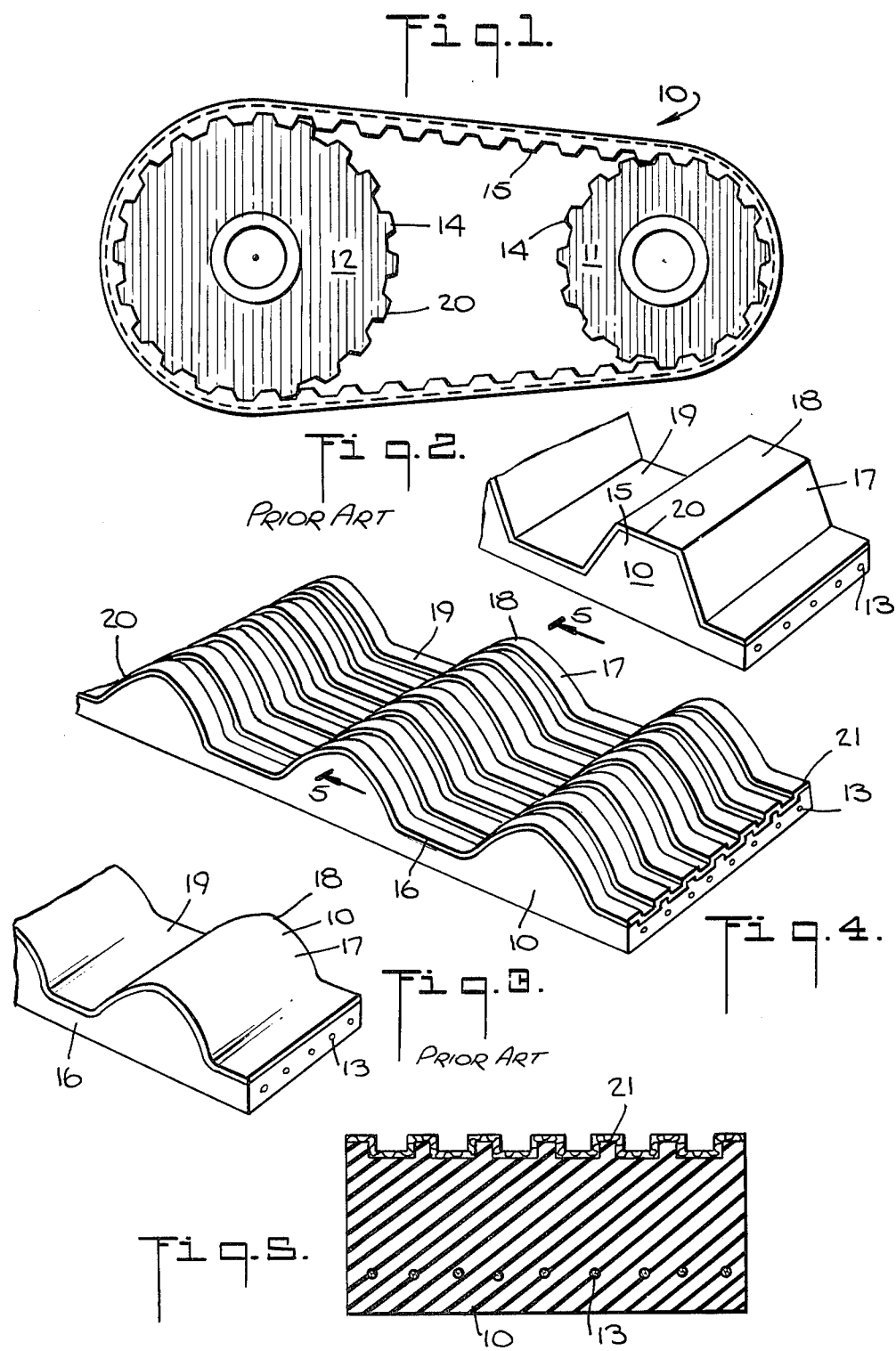

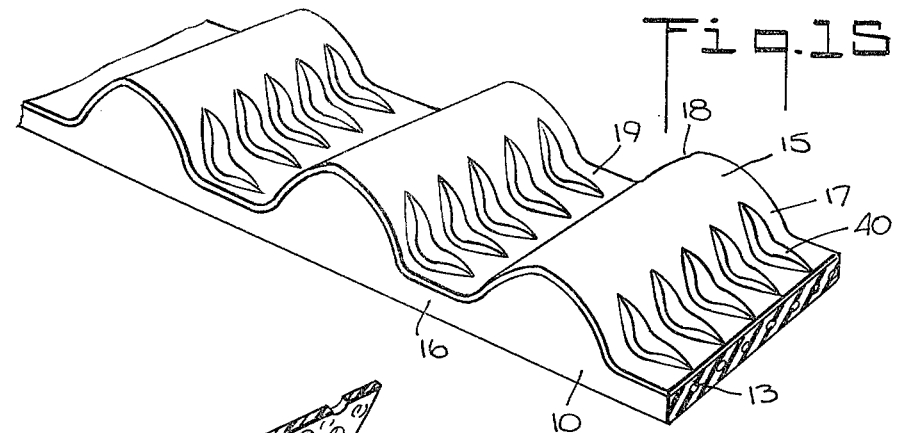
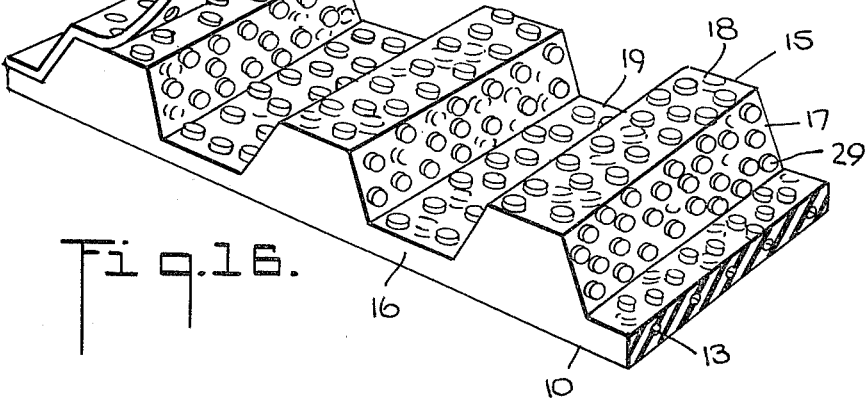
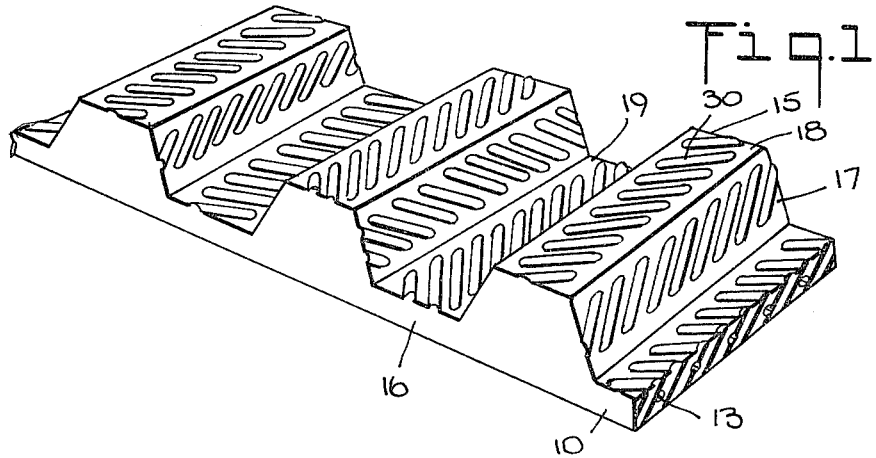

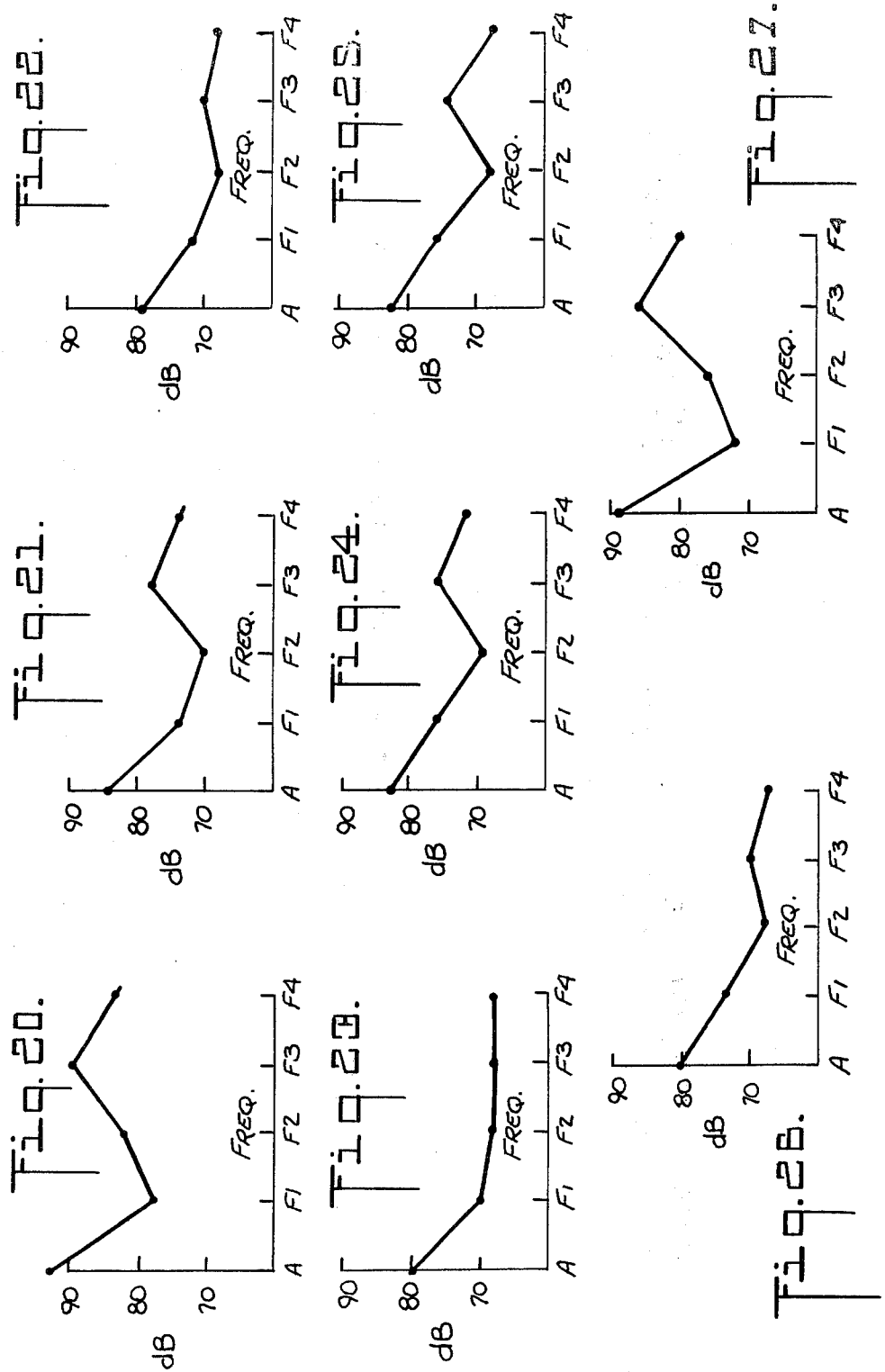

REDUCED NOISE POSITIVE DRIVE POWER TRANSMISSION SYSTEM

BACKGROUND OF THE INVENTION

This invention relates to positive drive power transmission systems composed of toothed belts in combination with toothed pulleys and methods for making such toothed belts. More particularly, the invention is directed to positive drive power transmission systems in which the operating noise resulting from the impact of the toothed belts against their corresponding toothed pulleys is reduced substantially.

U.S. Pat. No. 2,507,852, issued on May 16, 1952 to R. Y. Case, describes in detail a power transmission belt comprising an inextensible tensile member having teeth bonded to it on one side. A protective jacket fabric covers the teeth. The teeth are made of an elastomeric material, such as rubber. The belt is designed to mesh with one or more toothed pulleys that are constructed of material having a higher Young's modulus than the elastomeric material of the belt teeth.

Such toothed belts have been constructed with teeth of various cross-sectional configurations. The tooth cross-sectional configuration shown in the Case patent is trapezoidal, similar to that of a conventional rack gear tooth. U.S. Pat. No. 3,756,091, issued on Sept. 4, 1973 to H. F. Miller, describes in detail a similar power transmission belt where the tooth cross-sectional configuration is substantially curvilinear being partially composed of two intersecting arcs. Different tooth cross-sectional configurations have been described in patents such as U.S. Pat. No. 3,924,481, issued on Dec. 9, 1975 to M. J. W. Gregg; U.S. Pat. No. 4,037,485, issued July 26, 1977 to R. D. Hoback; U.S. Pat. No. 4,066,732, issued Jan. 3, 1978 to J. D. Redmond; and U.S. Pat. No. 4,108,011, issued Aug. 22, 1978 to M. J. W. Gregg et. al., and in the literature. Toothed power transmission belts having cross-sectional configurations as described in the patents to Case and Miller, as well as belts having teeth of other configurations, are used throughout industry.

In any such positive drive power transmission system, the belt and pulleys forcefully engage or collide with each other when they mesh. A noise results from this impact contact.

The characteristic sound of such a positive drive power transmission system in operation is a loud "whine". The whine is comprised primarily of the meshing frequency of the system i.e. the frequency of collisions or impact contacts between the toothed belt and its pulleys and the integer harmonics of the meshing frequency. The meshing frequency is calculated by multiplying the number of grooves in the pulley by the pulley's speed of rotation. For example, a belt running on a 30-groove pulley turning at 40 revolutions per second would generate a noise composed of a 1200 Hz fundamental frequency and its integer harmonics, i.e. 2400 Hz, 3600 Hz, etc. When positive drive power transmission systems are operated under conditions of high horsepower, torque, and speed, noise levels in excess of 80 dB normally result. It is not uncommon for noise to be generated in excess of 90 dB.

Investigations of the effects of noise on hearing have shown that exposure to sound levels equal or greater than 85 dB for lengthly periods of time may result in permanent hearing loss. Thus various government regulations have been promulgated controlling exposure to high noise levels. As a result of such regulation and as a safety precaution, it is becoming common in industry to limit the durations of time a worker can be exposed to high noise levels and to require the wearing of ear protective devices.

Limitations related to noise have prevented the widespread use of toothed belt drives in certain industries. For example, the textile industry utilizes yarn twisting machines which are driven by V-belts. The energy required to operate them could be reduced substantially if toothed belts could be substituted for V-belts. However, the drive conditions and background noise levels are such that added noise due to positive drive power transmission systems could not be tolerated.

Until the present invention, there was no way to modify the belt or pulleys in a positive drive power transmission system to significantly reduce the noise levels in those cases where the impact contact between the belt and pulleys produces unacceptably high noise levels. Noise could only be reduced by surrounding the entire positive drive power transmissions system with an acoustic guard or enclosure. The use of an acoustic guard or enclosure is not only costly, but adds to the problems of maintenance, and trapped heat within the enclosure, and to the bulk of the machine.

SUMMARY OF THE INVENTION

It is an object of the present invention to provide an improvement in toothed belt and pulley positive drive power transmission systems which cause such systems to generate less noise during operation than systems not incorporating the improvement.

Noise reduction is achieved by the placing of surface discontinuities on the belt, the pulley, or both wherever noise generating impact contact takes place between the belt and the pulleys. These discontinuities act to modify the impact contact between the belt and pulley and thus reduce the resulting noise.

As used herein, the term "surface discontinuities" means a series of raised or recessed portions on the working surface of the belt or pulley. The surface discontinuities can be uniform or non-uniform in shape and distributions. They may be straight or curved. They may have any vertical and horizontal cross-sectional contours or combinations of contours. They may be continuous or discontinuous or any combination thereof. The dimensions of individual elements forming the surface discontinuities may be equal or unequal in height, depth, width or diameter. The surface discontinuities may be regularly or randomly spaced across the width of the belt or pulley.

In some power transmission systems, such as disclosed in the Case, Miller, and Redmond patents, noise generating impact contact takes place where the pulley teeth engage and compress the flank of the belt tooth and the belt land area. In other positive drive power transmission systems, such as disclosed in the patents to Hoback and Gregg, noise generating impact contact occurs where the belt teeth tips compressively engage the bottoms of the pulley cavities or grooves.

To be effective, the surface discontinuities must be placed where impact contact takes place. Thus for each type of positive drive power transmission system, the surface discontinuities may be at different locations. For ease of manufacture and to provide noise reduction for any possible combination of belts and pulleys, the surface discontinuities may be positioned over all areas where contact may possibly take place, i.e. over the entire working surface of the belt or pulley. Methods of manufacturing belts with such surface discontinuities are also disclosed.

BRIEF DESCRIPTION OF THE DRAWINGS

The invention will be more fully understood, while further objects and advantages will become apparent, in the following detailed description of the embodiments of the invention illustrated in the accompanying drawing, in which:

FIG. 1 is a side elevational view of a belt in engagement with two pulleys to form a toothed belt positive drive power transmission system;

FIG. 2 is a partial perspective view of a known positive drive transmission belt wherein each tooth has a trapezoidal longitudinal cross-sectional contour;

FIG. 3 is a partial perspective view of a known positive drive transmission belt wherein each tooth has a curvilinear longitudinal cross-sectional contour;

FIG. 4 is a partial perspective view of a positive drive transmission belt of the type shown in FIG. 3 with surface discontinuities in accordance with one embodiment of the present invention;

FIG. 5 is an enlarged cross-sectional view of the belt of FIG. 4 taken along the line 5—5 of FIG. 4.

FIGS. 15 to 17 are partial perspective views of several embodiments of a positive drive belt according to the present invention;

FIGS. 20 to 33 are graphs of the noise generated by various positive drive power transmission systems.

DETAILED DESCRIPTION OF THE INVENTION

Figure 6:
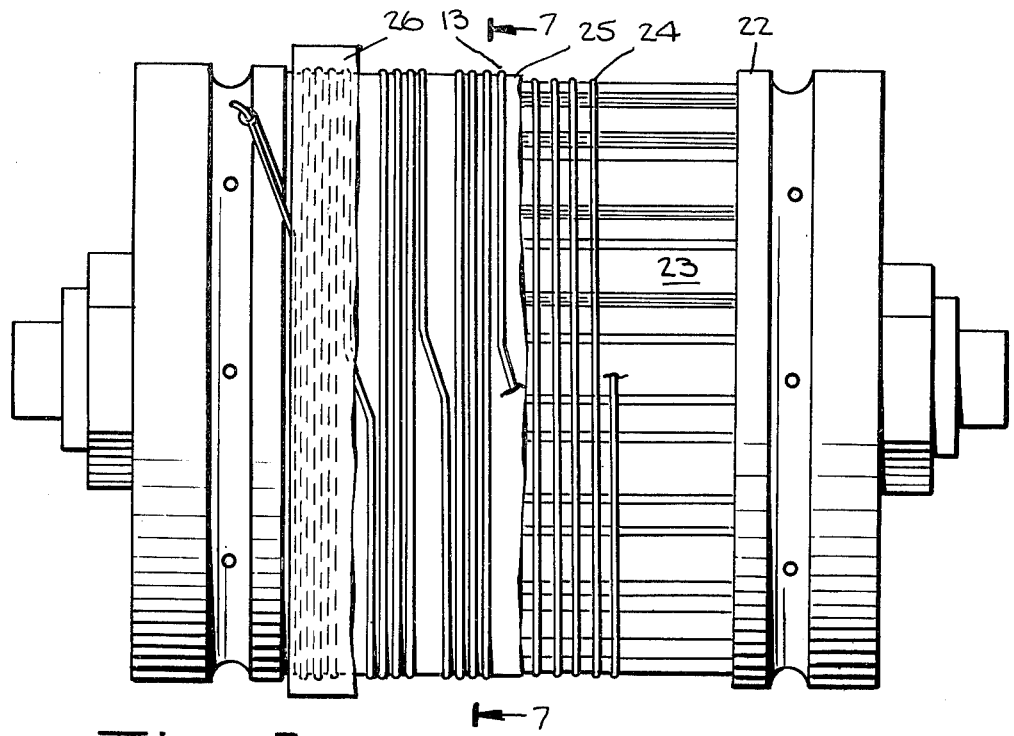
FIG. 6 is an elevational view of a trapezoidal toothed belt mold with the belt parts built up thereon in accordance with one embodiment of the method of manufacturing the belt in accordance with the present invention in readiness for the molding operation, but showing parts of the belt broken away to better illustrate the process of manufacture.

As seen in FIG. 1, a positive drive power transmission system is shown composed of an endless toothed belt 10 and two toothed pulleys 11 and 12. The belt 10 transmits power from the driving pulley 11 to the driven pulley 12. The belt 10 is provided with a tensile member 13 formed from a plurality of turns of a continuous strand of filamentary material. The tensile member 13 carries substantially the entire working load imposed upon the belt 10.

The pulleys 11 and 12 have teeth 14 made of relatively rigid material, such as metal or hard plastic. The belt 10 has teeth 15 made of somewhat yieldable resilient elastomer or plastic material which is sufficiently firm to substantially maintain its shape under the load imposed on it.

FIGS. 2 and 3 illustrate belts 10 having teeth with different cross-sectional configurations, i.e. trapezoidal and curvilinear, respectively. The belt shown in FIG. 2 is of the type disclosed in the Case patent and the belt shown in FIG. 3 is of the type disclosed in the Miller patent. Belts with these cross-sectional configurations, as well as belts with other cross-sectional configurations such as those previously described, are commonly used to form one of the components of positive drive power transmission systems. The belts 10 shown in FIGS. 2 and 3 have their teeth 15 on one side of the belt. Teeth may, however, be positioned on two or more sides of the belt 10. The teeth on different sides of the belt need not have the same cross-sectional configurations. The Case and Miller patents may be consulted for a more detailed description of their respective positive drive power transmission systems.

Figure 14:
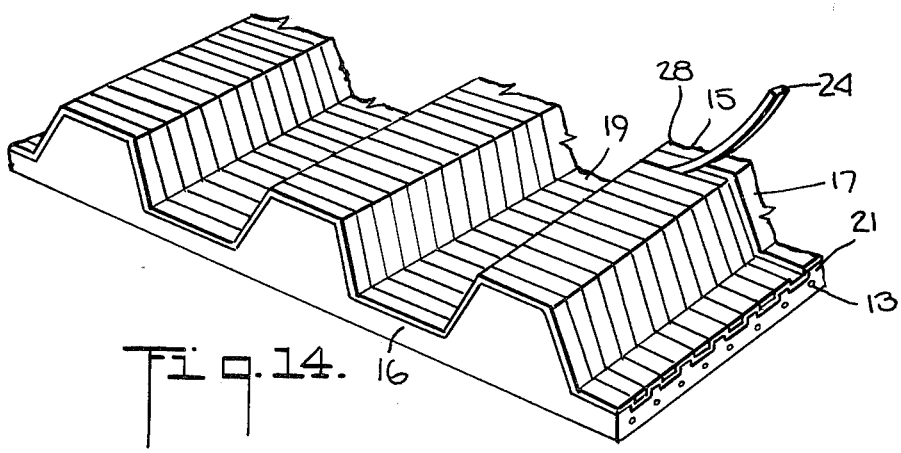
FIG. 14 is a partial perspective view of one embodiment of the belt of the present invention just after removal from the belt mold of FIGS. 6-13.

FIGS. 14, 16 and 17 disclose belts in accordance with the present invention having teeth with trapezoidal cross-sectional configurations in accordance with the Case patent and FIGS. 4, 5 and 15 disclose belts with teeth having curvilinear cross-sectional configurations in accordance with the Miller patent. The present invention is equally applicable to these belts as well as belts having teeth with different cross-sectional configurations such as those disclosed in the Gregg, Hoback, Redmond and Gregg et. al. patents.

As seen most clearly in FIGS. 2 and 3, the positive drive belt 10 has teeth 15 bonded to the body 16 of the belt. The tensile member 13 is embedded in the body 16. The inner or working surface of the belt can be divided into three areas: teeth flanks 17, teeth tips 18 and land surfaces 19 between adjacent teeth 15. Each pulley 11 and 12 is composed of a body portion 40 with teeth 14 formed thereon. The outer or working surface of the pulley 11 and 12 is composed of two areas: pulley teeth tips 33 and the pulley cavities or grooves 34. The pulley cavities or grooves 34 may be considered to have flank portions and land portions separating the flank portions of adjacent teeth.

In operation, any toothed positive drive power transmission system produces a noise when working surfaces of the the belt and pulleys collide or have impact contact with each other as they work. For any given system, the level of the noise depends on a number of parameters including tension, horsepower, torque and speed of operation. As previously noted, the sound is characteristically that of a whine comprised primarily of the meshing frequency and its integer harmonics.

In operation, this characteristic sound can exceed acceptable industrial standards. With noise levels in excess of 90 dB common, use of such systems in certain applications is either unacceptable or requires protective measures such as limiting durations of personnel exposure, or the use of ear protection devices or accoustic guards on the machinery.

In accordance with the present invention, dramatic noise reduction is achieved by the placing of surface discontinuities on the working surface of the belt, pulley, or both wherever noise generating impact contact takes place between the belt and the pulley. The surface discontinuities act to modify the impact during meshing of the belt with the pulley. This effect sharply reduces the noise generated by such impact. As previously noted, different belt and pulley designs and possible combinations of such designs have different areas of noise generating impact contact. Therefore, for ease of manufacture and to provide noise reduction for any belt and pulley combination such surface discontinuities may extend completely over the working surfaces of the belt, pulley or both.

FIGS. 4, 5 show a belt 10 in accordance with the teaching of the Miller patent having the preferred embodiment of surface discontinuities formed on its working surface. While the surface discontinuities are shown on a belt having teeth with a curvilinear configuration, the invention works with the teeth of other cross-sectional configurations. The surface discontinuities of this embodiment are in the form of longitudinal ridges 21 spaced transversely across the entire working surface of the belt 10, i.e. teeth flanks 17, teeth tips 18 and land surfaces 19. The ridges 21 extend parallel to each other in the longitudinal operating direction of the belt. As shown there are seven ridges 21. There may, however, be more or less than this number.

Figure 7:
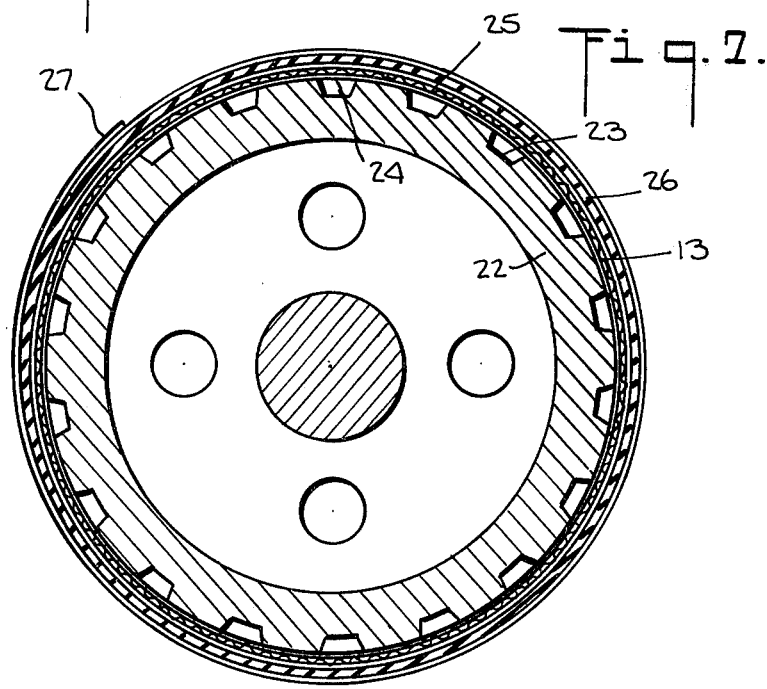
FIG. 7 is a cross-sectional view of the mold assembly shown in FIG. 6, taken on line 7—7 of FIG. 6.
Figure 8:
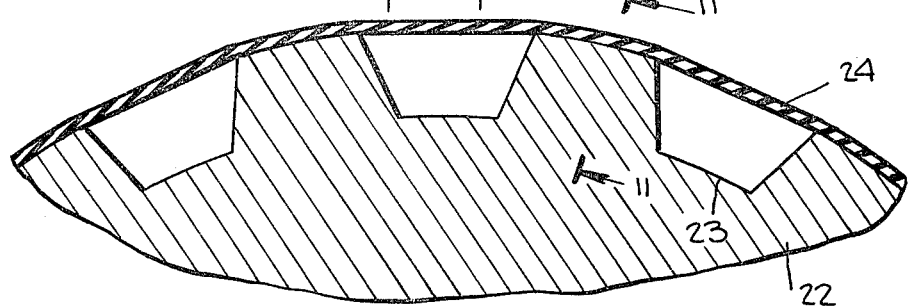
FIGS. 8 to 10 are partial cross-sectional views of the belt mold showing the build-up of the mold and belt parts prior to molding in one embodiment of the method of manufacturing a belt in accordance with the present invention.

While this embodiment may be made in a number of ways, it is preferable to use an improvement of the method described in U.S. Pat. No. 3,078,206, issued on Feb. 19, 1962 to W. A. Skura. FIGS. 6-14 illustrate the method of placing ridges of one preferred embodiment of surface discontinuities on a trapezoidal toothed belt. As in the method disclosed in the Skura patent, the elements of the belt 10 are built upon a mold 22 having axially extending trapezoidal grooves 23 which grooves constitute molds for the formation of the belt teeth 15. As seen in FIGS. 6, 7 and 8, prior to building the elements of the belt 10 on the mold 22, extensible thread 24 is spirally wound around the mold 22. The thread is made from a material, such as a cured rubber which is treated or selected so as not to bond to the belt 10 during its vulcanization. Instead of spirally winding thread, a series of spaced bands may be used. The cross-sectional configuration of the thread 24 may be square, rectangular, circular, trapezoidal or any other suitable configuration, as will become readily apparent hereinafter. The dimensions of the thread cross-section will control the height, the shape of the flanks and the width of the space between the surface discontinuities. The spacing of the thread winding will control the width of the surface discontinuities.

Figure 9:
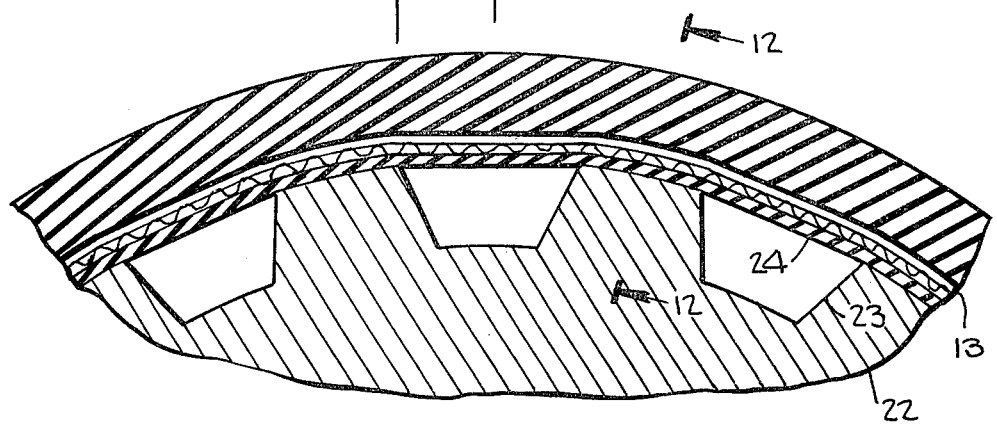
Figure 10:
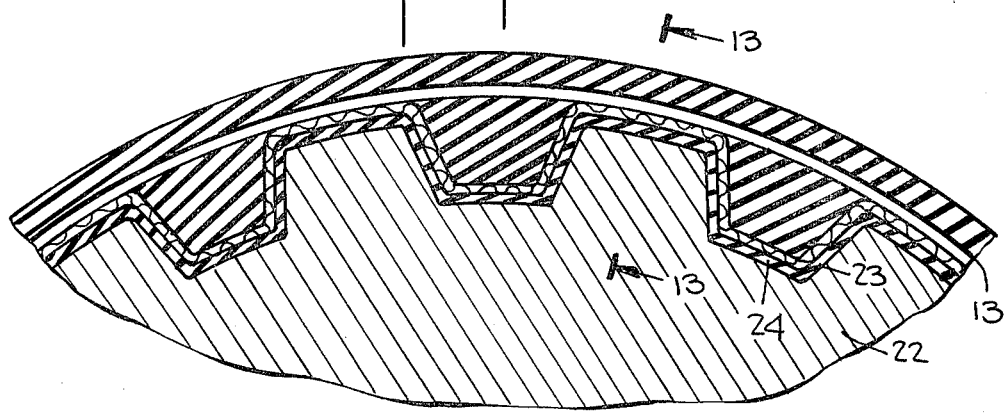
Figure 11:
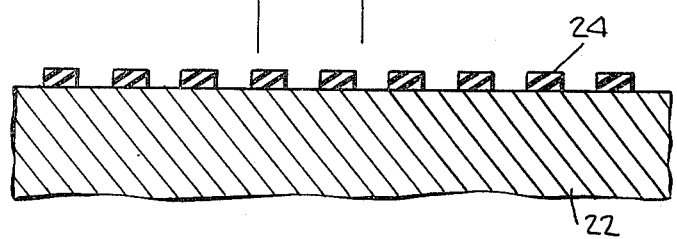
FIGS. 11, 12 and 13 are partial cross-sectional views of a mold assembly and belt parts shown in FIGS. 8, 9 and 10 taken on lines 11—11, 12—12, 13—13, respectively, showing the steps in one embodiment of the method of manufacturing a belt in accordance with the present invention.
Figure 12:
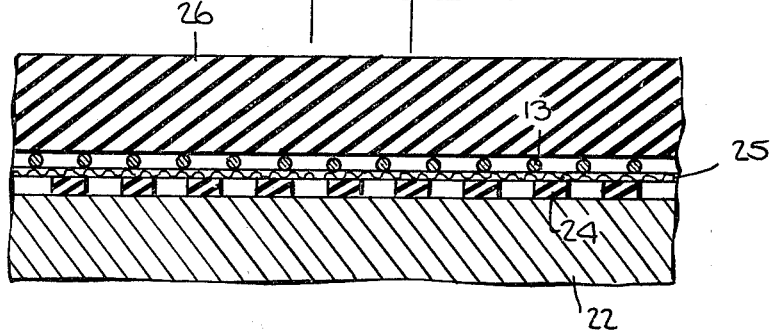
Figure 13:
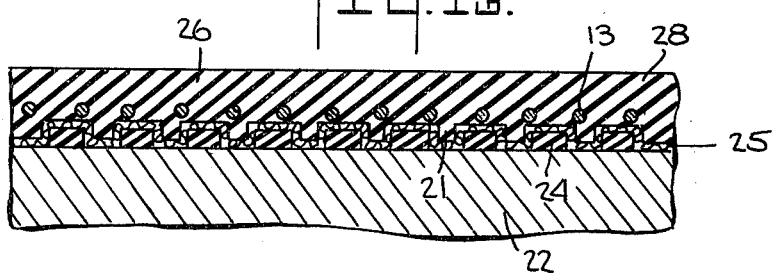

If the belt is to have one or more jackets 20, one or more layers of stretchable fabric 25 is then applied around the mold 22 over the thread 24. The tensile member 13 is then spirally wound around the fabric 25. An elastomer layer 26 is positioned around the tensile member 13. a curing bag or wrap 27 for applying pressure to the belt parts 13, and 24-26 is positioned around the elastomer layer 26. The entire assembly is heated and pressure is applied to curing bag or wrap 27 to force the elastomer 26 between spaces in the tension member 13 as shown in FIGS. 9 and 10 to form and vulcanize the belt 10. See the Skura patent for details of the molding and curing process.

As seen in FIGS. 11-14, during the molding process the fabric 25 as forced by the elastomer 26 down and around thread 24, thereby acting to mold the surface discontinuites 21 into the belt 10. When the resulting belt slab 28 is removed from the mold 22, the thred 24 is carried with it. Since the thread 24 does not adhere to the belt slab 28, it may be simply removed. Thereafter the belt slab 28 is cut into individual belts 10. Each such belt has surface discontinuites 21 running longitudinally along the working surface of the belt 10.

In an alternative method, the thread 24 may be substantially inextensible and frangible. The force and pressure exerted would then cause the portion of the thread between the raised ribs on the mold to break. Thus, the thread would result only in creating surface discontinuities on portions of the belt teeth flanks 17 and the land surfaces 19.

As another alternative an inextensible thread may be applied over the surface of the grooved mold by use of adherents or by preforming the required contours in a rigid thread.

The use of either extensible or frangible thread, provides means for creating longitudinally extending surface discontinuities without modifying the actual mold used in manufacturing the belt.

The selection of surface discontinuity dimensions (length, width, height, and spacing) will be influenced by the size of the teeth of the belt as well as by the compressibility of the surface discontinuities in relation to the loads to be encountered by the belt. Larger surface discontinuities having dimensions such as 0.05 inch for height, width, and spacing, were found useful in the large pitch belt such as 14 mm belts while smaller dimensions such as 0.03 inch were advantageous in the smaller belts such as one-half inch pitch belts. Belt tooth sizes and pitches cover a wide range for applications from fractional horsepower to hundreds of horsepower. Experiments have shown that the most useful range of dimensions for the surface discontinuities lies between one sixty-fourth inch and one eighth inch in height, spacing and width, with the surface discontinuities covering between one quarter and three quarters of the portion of the working surface containing the discontinuities.

FIGS. 15, 16 & 17 show alternate embodiments of belt 10 having surface discontinuites in accordance with the present invention. In these embodiments surface discontinuities are discontinuous across the surface of the belt and extend less than the distance between adjacent teeth. In FIG. 15, the belt 10 is of the type disclosed in the Miller patent. In such positive drive power transmission systems, noise generating impact contact occurs in the area of the juncture of the belt teeth flanks 17 and the belt land areas 19. The surface discontinuities 40, may accordingly be placed only in this impact contact area, i.e. on the land areas 19 and teeth flanks 17 of the belt tooth, but need not be placed on the teeth tips 18. Alternatively, they may be placed over the entire working surface of the belt 10. If impact contact occured only in the belt tooth tip area, the surface discontinuities could be confined to that area.

In FIG. 16 a belt 10 has the surface discontinuities 29 in the form of circular raised portions, equally recessed portions may be used. These surface discontinuities 29 are shown as cylindrical. As noted previously alternate shapes, such as hemispherical protuberances, may be used. The raised portions may be in a random or uniform pattern but arranged such that one-quarter to three-quarters of the impact contact area is raised. The surface discontinuities may be confined to the impact contact area or cover the entire working surface of the belt 10.

FIG. 17 discloses a belt having teeth where the surface discontinuities are on the entire working surface 17, 18 and 19 of the belt 10. The surface discontinuities are a plurality of parallel, uniformly spaced discontinuous ridge-like projections 30 placed in a "herringbone" or zig-zag pattern. The surface discontinuities may be oriented at any angle to the tensile member, including perpendicular to the operating directions of the belt.

FIGS. 15, 16 and 17 disclose just some of the possible shapes of the surface discontinuities which discontinuities may be positioned over the entire working surface of the belt or be confined to the impact contact area. Belts such as shown in these figures may be manufactured by the same method as that of the preferred embodiment except that instead of winding thread 24 around the mold 22, a sheet 31 of cured extensible material with holes, cavities, or raised portions corresponding to the desired surface discontinuities positioned thereon. The material forming sheet 31 is selected or is treated so as not to bond to the belt 10 during its vulcanization. Such a sheet 31 is being shown removed from the belt of FIG. 16 after vulcanization of the belt.

Alternatively, the sheet 31 may be formed from an inextensible frangible material which is positioned around the mold 22 but not in the mold grooves 23. The sheet 31 will break during molding, creating surface discontinuities on only a portion of the belt 10. As a further alternative an inextensible sheet may be positioned around the mold 22 and in grooves 23 by means of an adherent or by pre-shaping of the sheet 31 to the contours of the mold 22.

The mold 22 can be made with surface discontinuities formed in its surface. This may require that the mold 22 be collapsible radially inwardly for belt slab removal. This latter method would however eliminate the need for use of a thread 24, or sheet 31.

In a still further embodiment of the method for making the belt 10 according to the present invention the surface discontinuity can be provided through the use of a jacket fabric 25 having surface discontinuities formed therein. The jacket must be of such a tight weave, or precoated, to prevent rubber strike-through during the belt curing process. The surface of the jacket 25 which would face the mold would be of such a material as would not flatten out during the belt fabrication and curing process. The surface discontinuities could be obtained by a pronounced weave in the jacket fabric 25, and by the application of a high-melting on nonthermoplastic material attached to the fabric by molding or by other means. The fabric 25 may be extensible or inextensible depending on its method of application.

The belt 10 can be manufactured by methods other than that shown in the Skura patent, such as by step cures in which belt materials are progressively advanced between flat molding plates or by continuous molding techniques where the belt elements are advanced between a heated grooved cylindrical mold and a pressure band. Using such systems, the surface discontinuities can be formed directly in the mold surfaces. Finally a belt 10 in accordance with the present invention can be made by using substantially liquid elastomer introduced into a cavity between a mold and an external cylinder. The mold could be prepared with thread 24 or sheet 31 as previously discussed.

Figure 18:
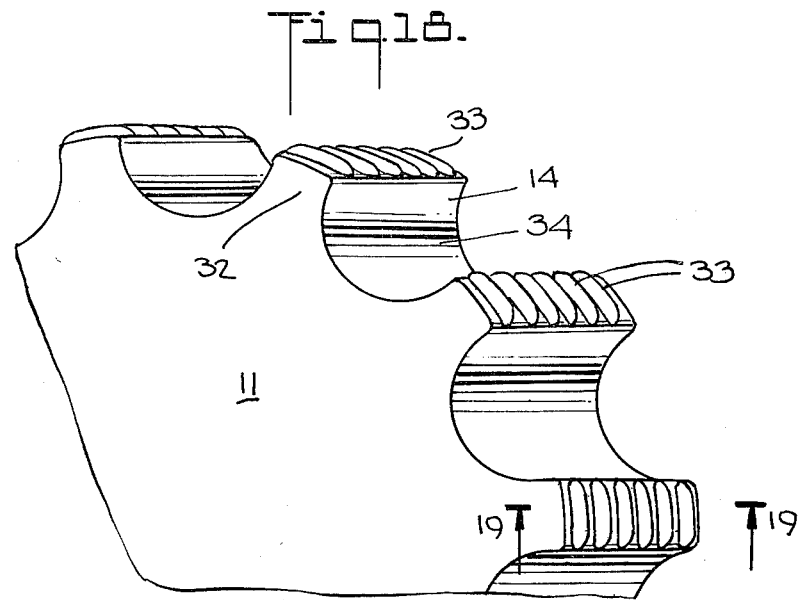
FIG. 18 is a partial perspective view of a toothed pulley in accordance with one embodiment of the present invention.
Figure 19:
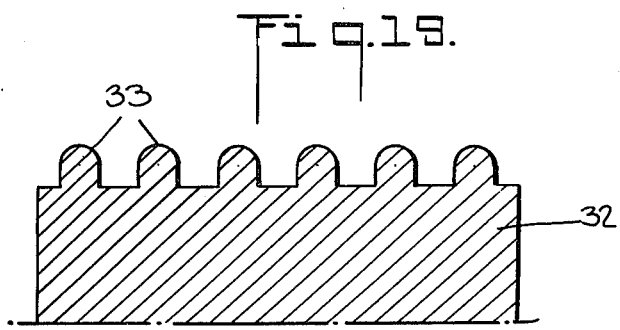
FIG. 19 is a partial cross-sectional view of the pulley of FIG. 18 taken along the line 19—19 of FIG. 18.

FIGS. 18 and 19 show a pulley 11 having surface discontinuities in the pulley teeth tips 32 in the form of parallel serrations 33. The cross sectional configuration of the surface discontinuities is shown as semi-circular. Alternate cross sectional contours can also produce noise reduction. The surface discontinuities may be regularly or randomly spaced. They may be positioned at an angle to the pulley. If the area of impact contact between the belt and pulleys occur in the pulley cavities or grooves 34, the surface discontinuities should be located in this area. Alternatively the entire working surface, i.e. tooth tips 32 and cavities 34, could have surface discontinuities thereon.

FIGS. 20 through 33 are graphs of test results showing noise produced by positive drive power transmission systems with and without surface discontinuities. These and similar tests have shown that surface discontinuities with dimensions between one sixty-fourth and one eighth inch in height, spacing, and width, which cover one-quarter to three-quarters of the working surface where impact contact takes place are effective in reducing noise. The larger dimensions are utilized in those belt pitches characterized by large teeth.

A precision sound level meter was used for noise tests. The decible (dB) scale has been adopted internationally for use with sound level metering testing. The dB ratings are sometimes weighted to correspond with the subjective response of the ear. The weighted dB readings are known as dB(A).

For each test, the overall dB(A) value was recorded and is plotted on each graph above the notation "A". In addition, in each test a ⅓-octave spectrum analyzer was used to evaluate the unweighted values at the frequencies making up the sound produced by the belt and pulley. The spectrum analyzer divides the range of frequencies audible to humans into 30 bands, each designated by its center frequency such as 2,000, 2,500, 3,150, 4,000 Hz, etc. If a sound has a particularly high component around 3,000 Hz, it will be indicated as a high reading of the 3,125 Hz center-frequency band.

FIGS. 20 through 31 utilize jacketed 14 mm pitch belts with 100 curvilinear teeth having cross-sectional configurations in accordance with the Miller patent. Each belt was 40 mm wide. The running condition was selected to produce a noise level such as encountered in normal operation of such positive drive power transmission systems. The tests were run at 1875 RPM using 32-groove pulleys to produce a meshing frequency of belt tooth will pulley groove of 1000 impact contacts per second.

This frequency is shown as $F_1$ on the horizontal axis of each graph, and $F_2$, $F_3$ and $F_4$ represent the integer harmonic center-frequency values of 2000, 3125, and 4000 Hz. The lower noise levels observed at intermediate frequencies between $F_1$, $F_2$, $F_3$, and $F_4$ are omitted from the graphs for easier interpretation.

Figure 30:
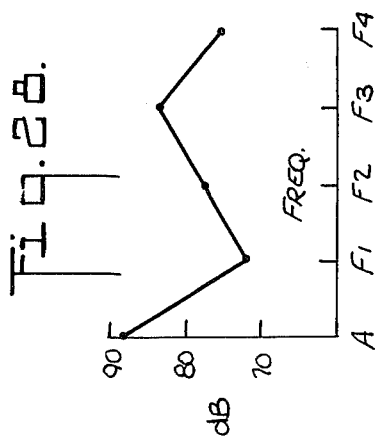
Figure 31:
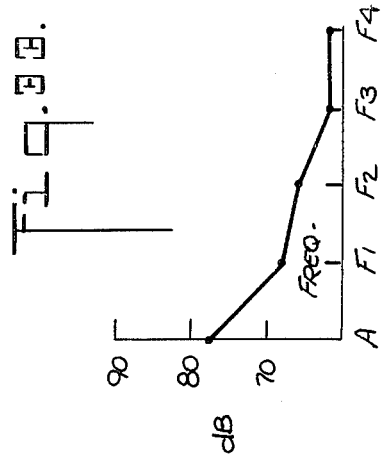

In the experiments represented by FIGS. 20–29 standard pulleys in accordance with the Miller patent were used. In the experiments of FIGS. 30 and 31 pulleys 11 and 12 had surface discontinuities.

In FIG. 20 the results are shown of running the positive drive power transmission system without surface discontinuities. The system had an overall noise reading of 93 dB(A) and a range of 78 to 90 dB for the meshing frequency and its harmonics.

In FIGS. 21 through 29, surface discontinuities of the type shown in the preferred embodiment manufactured by the preferred method were used. Precured rubber threads of various sizes were wound on the mold surface at various turns-per-inch of application, the resulting ridges had specific dimensions of height, spacing between adjacent ridges, and width, so that the effect of such dimensions on noise could be demonstrated.

In FIGS. 21, 22, 23 square cross-section cured rubber thread of approximately 0.056 inch thickness and width was wound over the cylindrical mold at 6, 9 and 12 turns per inch resulting in belts having parallel ridges approximately 0.05 inch high and with widths of approximately 0.11 inch, 0.05 inch and 0.03 inch respectively. In all three cases the overall noise level was less than the 93 dB(A) of FIG. 20, and the highest band reading was reduced below the 90 dB observed at $F_3$ in FIG. 20. Specifically the observed readings were, for FIG. 21: 84 dB(A) and 78 dB at $F_3$, FIG. 22: 79 dB(A) and 70 dB at $F_3$, FIG. 23: 80 dB(A) and 68 dB at $F_3$. The belt of FIG. 22 which showed the lowest noise level had 50 percent of its area composed of the raised discontinuities. FIG. 21 was 67 percent raised and FIG. 23 was 33 percent raised.

For FIGS. 24, 25 and 26 smaller 0.042 inch square cross-section cured rubber thread was used at 8, 12, and 16 turns-per-inch, producing surface discontinuities having height and spacing of 0.04 inch, widths of 0.08 inch, 0.04 inch, and 0.02 inch and raised portions covering 67, 50, and 33 percent of the area respectively. The noise levels were all lower than that using the plain belt of FIG. 20 but not quite as effective as the discontinuities of FIG. 22.

Figure 28:
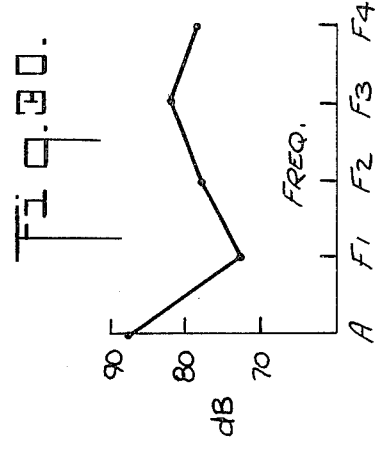
Figure 29:
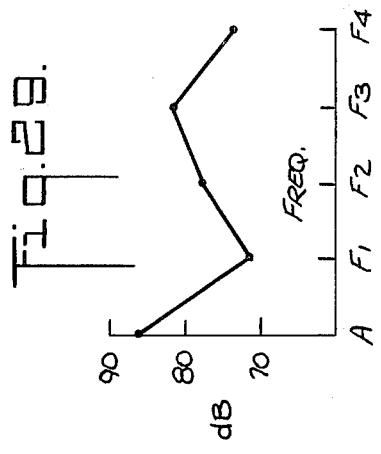

FIGS. 27, 28, and 29 utilized an even finer 0.033 inch square cross-section cured rubber thread applied at 8, 12 and 16 turns per inch to provide surface discontinuities having height and spacing of 0.03 inch and widths of 0.09 inch, 0.05 inch, and 0.03 inch and covering 73, 60 and 40 percent of the area respectively. In all three cases noise levels were reduced from those of the plain belt of FIG. 20, but not to the extent experienced in FIG. 22.

These and other tests indicate that noise reductions are greatest when the dimensions of height, spacing, and width of the discontinuities are between one sixty-fourth inch and one eighth inch and the raised portion of the surface discontinuities cover between one-quarter and three-quarters of the surface. These results indicate that even the smaller dimensioned surface discontinuities such as would of necessity have to be used on the smaller teeth of small pitch belts have the desired capability of reducing noise. For large pitches such as the 14 mm pitch belt the larger surface discontinuities as those of FIGS. 21–23 are particularly advantageous.

In the test of FIG. 30 the test of FIG. 20 was repeated except that the pulley had surface discontinuities of the type shown in FIGS. 19 and 20. The height, width, and spacing from the next was one-sixteenth inch, and the top of each discontinuity was rounded to a radius of one thrity-second inch. Using a standard mating belt the overall noise was reduced from the 93 dB(A) of FIG. 20 to 88 dB(A), and the $F_3$ value from 90 to 82 dB.

In the test of FIG. 31 the test of FIG. 30 was repeated except that the belt also had surface discontinuities of 0.05 inch height and spacing with a width of 0.08 inch. The noise level was 84 dB(A) with 72 dB at $F_3$, which are seen to be lower values than those of FIG. 30.

Thus the noise levels are reduced by the presence of the surface discontinuities on not only the belt alone, or the pulley alone, but when situated on both the belt and pulley.

Figure 32:

In the test of FIG. 32, a standard 0.5 inch pitch trapezoidal tooth belt (as described in the Engineering Standard Specification for Drives Using Synchronous Belts, issued by the Rubber Manufacturers Association and the Mechanical Power Transmission Association) tested with corresponding 22-groove pulleys at 1718 RPM (with a frequency of 630 Hz for $F_1$) produced 85 dB(A) and values of 70 dB for $F_1$ and $F_2$.

Figure 33:
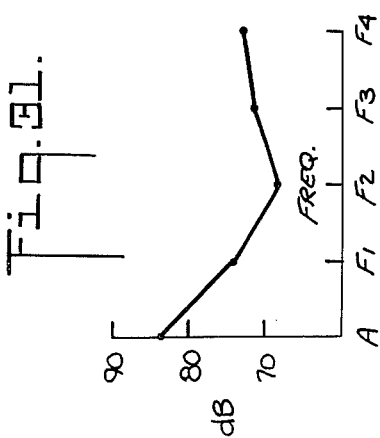

In the test of FIG. 33 the pulleys of FIG. 32 was conducted with similar belt having surface discontinuities of 0.04 height, width and spacing covering approximately fifty percent of the surface. The noise level was reduced to 78 dB(A), and 68 and 66 dB for $F_1$ and $F_2$ respectively, thus indicating the effectiveness of the surface discontinuities in reducing the noise of the trapezoidal belt system.

As noted in the National Bureau of Standards Handbook No. 119, a change of sound level of plus (or minus) 5 dB is quite noticeable and a change of sound level of plus (or minus) 10 dB is dramatic, nearly two times (or one-half) as loud. The graphical representations of the tests as shown in FIGS. 20 to 33 clearly indicate that the sound level reductions are "noticeable" and in many cases of "dramatic" magnitudes.

Various modifications in structure, steps or functions may be made by one skilled in the art to the disclosed embodiments of the invention without departing from the scope of the invention as defined by the claims.

What is claimed is:

1. A positive drive power transmission system including a belt having a tensile member with a plurality of elastomer teeth secured to at least one side of the tensile member and extending along the tensile member, with each belt tooth having a flank portion and a tip portion, said flank portion of one tooth being spaced from the next consecutive flank portion of a next consecutive belt tooth by a belt land area, at least one of said flank portions including a first working surface area, and at least one toothed pulley having a plurality of pulley teeth which mesh with the belt teeth, with each pulley tooth having a second working surface area which makes impact contact with the first working surface area of the respective belt teeth when the belt and pulley are in meshing engagement, the belt and pulley generating an operating noise level at a given meshing frequency characteristic of the impact contact between the first and second working surface areas of the belt and the pulley, the improvement comprising a plurality of projections of predetermined size and shape formed on said first working surface areas to modify the impact contact between the first and second working surface areas by promoting a cushioning effect at the area of impact contact and thereby reduce the operating noise level of said power transmission system at the given meshing frequency.

2. The system of claim 1 wherein the pulley teeth have tips and further comprising projections located at the pulley teeth tips where the tips of the pulley teeth come into impact contact with the belt.

3. The system of claim 1 further comprises projections located at the belt teeth tips where the tips of the belt teeth come into impact contact with the pulley.

4. The system of claim 1 wherein the pulley teeth are spaced from each other by grooves and where impact contact also takes place at or near the land area of the belt and said belt further comprising projections at the belt land area.

5. The system of claim 1 wherein said belt teeth flanks extend from said tips to said land area and wherein said pulley teeth have tips, said impact contact taking place at the belt tooth tips and the belt tooth flanks and there are projections at the belt tooth tips and the belt tooth flanks.

6. The system of claim 1 wherein the belt teeth flanks extend to said land area and where the impact contact takes place approximately at the junction of the belt land area with said belt flanks and there are projections at said junction.

7. The system of claim 1 wherein impact contact also takes place at or near the land area of the belt and there are projections at the belt land area.

8. A positive drive power transmission belt having a tensile member with a plurality of elastomer teeth secured to at least one side of the tensile member and extending along the tensile member, with each belt tooth having a flank portion and a tip portion, said flank portion of one tooth being spaced from the next consecutive flank portion of a next consecutive belt tooth by a belt land area, at least one of said flank portions including a working surface area which makes impact contact with a working surface area of a toothed pulley arranged to mesh at a given meshing frequency with said belt teeth when the belt and the pulley are used as part of a power transmission system, the given meshing frequency generating an operating noise level characteristic of the impact contact between the working surface areas of the belt and the pulley, the improvement comprising a plurality of projections of predetermined size and shape formed on the working surface area of said belt tooth flank portion so as to constitute a plurality of discontinuities on said belt tooth flank portion, to modify the impact contact between the working surface areas of the belt and the working surface areas of the pulley by promoting a cushioning effect at the area of impact contact and thereby reduce the operating noise level at the given meshing frequency of the power transmission system.

9. A belt according to claim 8 wherein the projections extend across substantially the width of the belt.

10. A belt according to claim 8 wherein the projections are randomly spaced.

11. A belt according to claim 8 wherein the projections are regularly spaced.

12. A belt according to claim 8 wherein each of the teeth has two flanks and the projections are on each of the tooth flanks.

13. A belt according to claim 8 wherein the projections are also on the tooth tips.

14. A belt in accordance with claim 8 wherein the projections form from one-quarter to three-quarters of the working surface of the belt in the area of impact contact.

15. A belt in accordance with claim 8 wherein the projections in the form of raised ridges.

16. A belt in accordance with claim 15 wherein the projections have a height between one sixty-fourth and one eighth inch.

17. A belt in accordance with claim 15 wherein the projections have a width between one sixty-fourth and one eighth inch.

18. A belt in accordance with claim 15 wherein the projections are spaced from each other between one sixty-fourth and one eighth inch.

19. A belt in accordance with claim 8 wherein the projections are formed of at least one material which also forms part of the remaining portions of the belt.

20. A belt according to claim 8 wherein the working surface includes the belt land area and further comprising projections extending over the entire extent of the belt land area between adjacent teeth.

21. A belt according to claim 8 wherein the working surface includes the belt land area and further comprising projections extending over less than the entire extent of the belt land area between adjacent teeth.

22. A positive drive power transmission belt have a tensile member with a plurality of elastomer teeth secured to at least one side of the tensile member and distributed along the tensile member, with each belt tooth having a flank portion, said flank portion of one belt tooth being spaced from the next consecutive flank portion of a next consecutive belt tooth by a belt land area, said flank portion of said one belt tooth including a working surface area which makes impact contact with a working surface area on the flank portion of the tooth of a toothed pulley arranged to mesh at a given meshing frequency with said belt teeth when the belt and the pulley are used as part of a power transmission system, the given meshing frequency generating an operating noise level characteristic of the impact contact between the working surface areas of the belt and the pulley, the improvement comprising a plurality of projections of predetermined size and shape formed on said working surface area of said belt for modifying the impact contact between the working surface area of the belt and the working surface areas of the pulley by promoting a cushioning effect at the area of impact contact and thereby reduce the operating noise level at the given meshing frequency.

23. A belt according to claim 22 further comprising projections in the belt land areas.

24. A belt according to claim 22 wherein the projections are immediately adjacent to the belt land areas.

25. A belt according to claim 22 wherein the projections are continuous over the entire length of the belt.

26. A belt according to claim 22 wherein the projections are discrete and discontinuous and are spaced over the working surface of the belt.

27. A belt according to claim 22 wherein the projections extend across substantially the width of the belt.

28. A belt according to claim 22 wherein the projections are randomly spaced.

29. A belt according to claim 22 wherein the projections are regularly spaced.

30. A belt according to claim 22 further comprising indentations on the tooth tips.

31. A belt according to claim 22 wherein the projections occupy from one-quarter to three-quarters of the working surface of the belt in the area of impact contact.

32. A belt in accordance with claim 22 wherein the projections have a height of between one sixty-fourth and one eighth inch.

33. A belt in accordance with claim 22 wherein the projections have a width between one sixty-fourth and one eighth inch.

34. A belt in accordance with claim 22 wherein the projections are spaced from each other between one sixity-fourth and one eighth inch.

35. A belt according to claim 22 wherein the working surface includes the belt land area and the indentations are over the entire extent of the belt land area between adjacent teeth.

36. A belt according to claim 22 wherein the working surface includes the belt land area and the identations are over less than the entire extent of the belt land area between adjacent teeth.

37. The positive drive power transmission belt of claim 22 wherein said belt comprises a fabric cover over said teeth, the surface of said fabric cover forms said working surface, and said fabric cover also covering said projections.

* * * * *

UNITED STATES PATENT AND TRADEMARK OFFICE
CERTIFICATE OF CORRECTION

PATENT NO. : 4,416,649
DATED : November 22, 1983
INVENTOR(S) : Robert C. Kohrn

It is certified that error appears in the above-identified patent and that said Letters Patent are hereby corrected as shown below:

Claim 15, line 2:
    Insert --are-- after "projections".

Claim 22, line 1:
    Change "have" to --having--.

Claims 30, 35 and 36, line 2:
    Change "indentations" to --projections--.

Signed and Sealed this

Twentieth Day of March 1984

[SEAL]

Attest:

Attesting Officer

GERALD J. MOSSINGHOFF
Commissioner of Patents and Trademarks